(12) United States Patent
Blasco Serrano et al.

(10) Patent No.: US 10,581,544 B2
(45) Date of Patent: Mar. 3, 2020

(54) SETTING A TIME REFERENCE IN A COMMUNICATIONS NETWORK

(71) Applicant: Telefonaktiebolaget LM Ericsson (publ), Stockholm (SE)

(72) Inventors: Ricardo Blasco Serrano, Stockholm (SE); Hieu Do, Järfälla (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 153 days.

(21) Appl. No.: 15/574,373

(22) PCT Filed: May 15, 2015

(86) PCT No.: PCT/EP2015/060810
§ 371 (c)(1),
(2) Date: Nov. 15, 2017

(87) PCT Pub. No.: WO2016/184488
PCT Pub. Date: Nov. 24, 2016

(65) Prior Publication Data
US 2018/0139002 A1      May 17, 2018

(51) Int. Cl.
*H04J 3/06*        (2006.01)
*H04W 76/14*    (2018.01)
(Continued)

(52) U.S. Cl.
CPC ............. *H04J 3/0658* (2013.01); *H04W 4/70* (2018.02); *H04W 56/002* (2013.01);
(Continued)

(58) Field of Classification Search
CPC ....... H04J 3/0658; H04W 4/70; H04W 76/14; H04W 56/002; H04W 56/004; H04W 24/08
See application file for complete search history.

(56) References Cited

U.S. PATENT DOCUMENTS

| | | | | |
|---|---|---|---|---|
| 2013/0029707 | A1* | 1/2013 | Virta | H04B 17/309 455/507 |
| 2016/0295532 | A1* | 10/2016 | Cao | H04W 56/001 |
| 2016/0302165 | A1* | 10/2016 | Da | H04W 56/002 |

FOREIGN PATENT DOCUMENTS

| | | | | |
|---|---|---|---|---|
| WO | WO-2014168570 | A2 * | 10/2014 | H04W 56/002 |
| WO | 2015065263 | A1 | 5/2015 | |

OTHER PUBLICATIONS

International Search Report and Written Opinion dated Feb. 8, 2016 for International Application Serial No. PCT/EP2015/060810, International Filing Date: May 15, 2015 consisting of 12-pages.
(Continued)

*Primary Examiner* — Melvin C Marcelo
(74) *Attorney, Agent, or Firm* — Patent Portfolio Builders, PLLC

(57) ABSTRACT

A device operates in a communications network by obtaining an adjustment term based on communications from the communications network and setting a time reference for the device based on the obtained adjustment term. The adjustment term is such that the set time reference for the device is common to at least one other device in communication with the device. The device further operates by communicating with the at least one other device in device-to-device communication, based on the common set time reference.

21 Claims, 7 Drawing Sheets

(51) Int. Cl.
 *H04W 56/00* (2009.01)
 *H04W 4/70* (2018.01)
 *H04W 24/08* (2009.01)
(52) U.S. Cl.
 CPC ......... *H04W 56/004* (2013.01); *H04W 76/14* (2018.02); *H04W 24/08* (2013.01)

(56) References Cited

OTHER PUBLICATIONS

3GPP TSG-RAN WG1 Meeting #75, R1-135090, Title: "The value of T2 for D2D transmission timing," Source: CATT, Agenda item: 6.2.8.3, Document for: Discussion and Decision, Conference Location and Date: San Francisco, USA, Nov. 11-15, 2013 consisting of 3-pages.

3GPP TSG-RAN WG1 Meeting #78, R1-143052, Title: "D2D synchronization procedure considering timing adjustment for out-of-coverage," Agenda Item: 7.2.3.3.3 Synchronization procedure, Source: ETRI, Document for: Discussion and Decision, Conference Location and Date: Dresden, Germany, Aug. 18-22, 2014 consisting of 5-pages.

3GPP TSG RAN WG1 Meeting #74bis, R1-134072, Title: "Considerations on timing and synchronization for D2D," Agenda Item: 7.2.8.1.1, Source: Huawei, HiSilicon, Document for: Discussion and decision, Conference Location and Date: Guangzhou, China, Oct. 7-11, 2013 consisting of 5-pages.

3GPP TSG RAN WG1 Meeting #75, R1-135091, Title: "Discussion on synchronization for D2D operation," Source: CATT, Agenda Item: 6.2.8.3, Document for: Discussion and decision, Conference Location and Date: San Francisco, USA, Nov. 11-15, 2013 consisting of 5-pages.

\* cited by examiner

SETTING A TIME REFERENCE IN A COMMUNICATIONS NETWORK

CROSS-REFERENCE TO RELATED APPLICATIONS

This Application is a Submission Under 35 U.S.C. § 371 for U.S. National Stage Patent Application of International Application Number: PCT/EP2015/060810, filed May 15, 2015 entitled "SETTING A TIME REFERENCE IN A COMMUNICATIONS NETWORK," the entirety of which is incorporated herein by reference.

TECHNICAL FIELD

This disclosure relates to a communications network and, in particular, to setting a time reference of a device in the communications network for communications with other devices.

BACKGROUND

In order to provide synchronous communication in a communication system (such as a Global System for Mobile (GSM) Communications, a Third Generation of Mobile Telecommunications Technology (3G) system, a Long-Term Evolution (LTE) system, etc), the system usually employs a mechanism for providing a transmitter and receiver with a common communications time reference, up to a certain precision.

A time reference (which may also be referred to as a timing reference) is a reference for use by devices in a communications network in timing their communications with other devices. For example, synchronous systems based on Orthogonal Frequency Division Multiplexing (OFDM) signals such as LTE may be designed under the assumption that the transmitter and receiver have time references whose difference does not exceed the duration $T_{CP}$ of the cyclic prefix. The objective may be that the signals arrive at the receiver (for example, a user equipment (UE) device or an evolved NodeB (eNB)) within the interval ($T_{ref}$, $T_{ref}+T_{CP}$), where $T_{ref}$ is the time reference at the receiver. This allows the receiver to correctly place its sampling window and reduce inter-carrier interference.

In cellular communications, the mechanism employed by the system may exploit the fact that a base station (for example, an eNB in an LTE system) is present at one end of a cellular communications link. For example, in downlink (DL) transmission (for example, from a serving eNB simultaneously to one or more UE devices), downlink timing is commonly used by each device served by a base station to derive a time reference based on signalling transmitted by the serving base station. In this case, it is possible to obtain a satisfactory time alignment because each device only needs to synchronize to a single transmitter (i.e. the transmitter of the serving base station).

In uplink (UL) transmission (for example, simultaneously from one or more UE devices to the serving eNB), uplink timing is commonly used by the serving base station to derive the time reference for each device served by the base station. The serving base station then communicates the derived time reference using appropriate signalling. In this case, it is possible to obtain a satisfactory time alignment because the transmitters of each device need to align with the same receiver (i.e. the receiver of the serving base station).

However, both downlink and uplink timing will depend on the topology of the network (for example, the distance between transmitters and receivers, etc). Moreover, the time reference that is derived is only valid for communications to or from the base station from which it is derived. This means that, if a device needs to communicate with a different base station it will first need to acquire the appropriate time reference.

This problem is particularly apparent in the case of device to device (D2D) communications within the communications network, since there may be several transmitters communicating with several receivers. In particular, in this case, each transmitter needs to have a time reference with each receiver within the intended communication range. However, establishing such common time references is complicated by the fact that the topology of a device to device network may change quickly.

For example, the targeted coverage area around a device to device transmitter may cut across the boundary of one or more cells of the communications network. This means that, in some cases, the uplink and downlink timing schemes mentioned above may not result in common or compatible time references. This may, for example, depend on the geometry of the cells and the positions of the device to device nodes. For example, if the device to device transmitter and the device to device receiver are located on different (for example, neighbouring) cells, the uplink and downlink timing schemes may not result in common or compatible time references.

Similarly, if the device to device transmitter is located close to its serving base station whereas the intended device to device receiver is located far away from its serving base station, the resulting time references at the devices may be incompatible for direct device to device communication. Existing methods for deriving common time references would produce timing discontinuities between devices. The problem is exacerbated by the fact that the base stations in the cells would not normally share a common time reference. In addition, it would not be possible for devices that are out of coverage to derive a valid time reference based on uplink and downlink timing schemes that require signalling by the network.

Therefore, there is a need for an improved method for deriving references (such as time and/or frequency references) to be used by devices for communications in a communications network, which does not depend on the topology of the network to thereby allow improved synchronization.

SUMMARY

According to a first aspect of the present disclosure, there is provided a method of operation of a device in a communications network, the method comprising: obtaining an adjustment term based on communications from the communications network; setting a time reference for the device based on the obtained adjustment term, wherein the adjustment term is such that the set time reference for the device is common to at least one other device; and communicating with the at least one other device in device-to-device communication, based on the common set time.

According to a second aspect of the present disclosure, there is provided a device for use in a communications network, the device comprising: a communications module operable to communicate with a communications network; and a processor operable to obtain an adjustment term based on communications from the communications network and to set a time reference for the device based on the obtained adjustment term, wherein the adjustment term is such that the set time reference for the device is common to at least one other device and wherein the communications module is operable to communicate with the at least one other device in device-to-device communication, based on the common set time reference.

According to a third aspect of the present disclosure, there is provided a method of operation of a base station in a communications network, the method comprising: determining a propagation delay for each device served by the base station; obtaining an adjustment term for each device served by the base station based on the respective propagation delay determined for the device; sending a signal comprising the obtained adjustment term to the respective devices so that the devices transmit according to the same time reference.

According to a fourth aspect of the present disclosure, there is provided a base station for use in a communications network, the base station comprising: a processor operable to determine a propagation delay for each device served by the base station and to obtain an adjustment term for each device served by the base station based on the respective propagation delay determined for the device; and a communications module operable to send a signal comprising the obtained adjustment term to the respective devices so that the devices transmit according to the same time reference.

According to a fifth aspect of the present disclosure, there is provided a communications network comprising: a base station according to the fourth aspect; and a device according to the second aspect, the device being in coverage of the base station.

According to a sixth aspect of the present disclosure, there is provided a method of operation of a device in a communications network, the method comprising: determining a time reference from communication with a base station of the communications network; determining an adjustment term for the time reference, wherein the adjustment term is a one-way propagation time between the device and a base station of the communications network; and communicating with at least one other device in device-to-device communication, based on the time reference adjusted by the adjustment term.

According to a seventh aspect of the present disclosure, there is provided a method of operation of a base station for a communications network, the method comprising: determining an adjustment term for adjustment of a time reference of a device in the communications network, wherein the adjustment term is a one-way propagation time between the device and the base station; and transmitting the adjustment term to the device.

According to a eighth aspect of the present disclosure, there is provided a computer program product, comprising a computer-readable storage medium containing instructions for causing a device to perform a method according to the first, third, sixth or seventh aspect.

This provides an improved mechanism for obtaining common references (such as time and/or frequency references) to be used by devices in a communications network for communications, which does not depend on the topology of the network to thereby allow improved synchronization.

DETAILED DESCRIPTION

Figure 1:
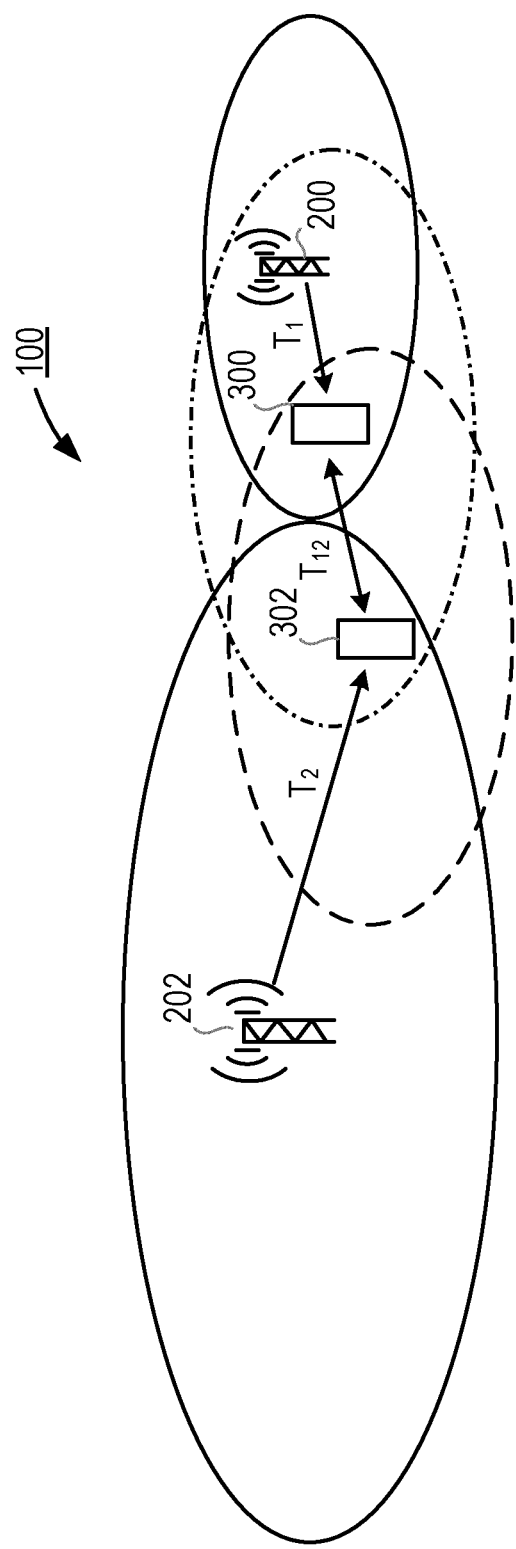
FIG. 1 shows a part of a communications network.

FIG. 1 illustrates a part of a communications network 100. The communications network 100 of FIG. 1 comprises two base stations 200, 202 and two devices 300, 302. However, it will be understood that the communications network 100 may comprise any other number of base stations and devices.

The base stations 200, 202 of the communications network 100 provide coverage for devices in their respective cells, and are typically connected to a core network of the communications network 100, allowing those devices to establish connections to other compatible devices. For example, the devices 300, 302 of the communications network are able to communicate with their serving base station 200, 202 and hence with other devices. Alternatively, the devices 300, 302 may communicate directly with other devices (D2D). In this way, the devices 300, 302 are able to establish connections with each other, and to engage in device to device communications. The established connection may be fixed.

The coverage area for each base station 200, 202 is marked with a solid line and the communication range for each device 300, 302 when performing D2D communications is marked with a dashed line. In this illustrated example, the devices 300, 302 are within D2D communication range of each other. It will be appreciated that any reference to D2D communications herein may include vehicle to any other device (V2x) communications.

The propagation delay, that is, the time taken for the signal to travel the distance between the base station 200 and the device 300, is indicated as $T_1$. The propagation delay, that is, the time taken for the signal to travel the distance between the base station 202 and the device 302, is indicated as $T_2$. The propagation delay, that is, the time taken for the signal to travel the distance between the devices 300, 302 is indicated as $T_{12}$.

The device 300 is able to connect to the base station 200 in whose coverage area it is located, but may also be able to detect signals transmitted by other base stations. The device 300 may be a user equipment (UE) device in the form of a portable communications device (for example, a portable phone, computer, or any other portable device). The device 300 may also take the form of a user device that is generally intended to remain in a fixed location, or may take the form of a device that automatically connects to the network when it has data to send. The device 300 may be carried by a user or placed in a vehicle or building.

Similarly, the device 302 is able to connect to the base station 202 in whose coverage area it is located, but may also be able to detect signals transmitted by other base stations. The device 302 may be a user equipment (UE) device in the form of a portable communications device (for example, a portable phone, computer, or any other portable device). The device 302 may also take the form of a user device that is generally intended to remain in a fixed location, or may take the form of a device that automatically connects to the network when it has data to send. The device 302 may be carried by a user or placed in a vehicle or building.

Figure 2:
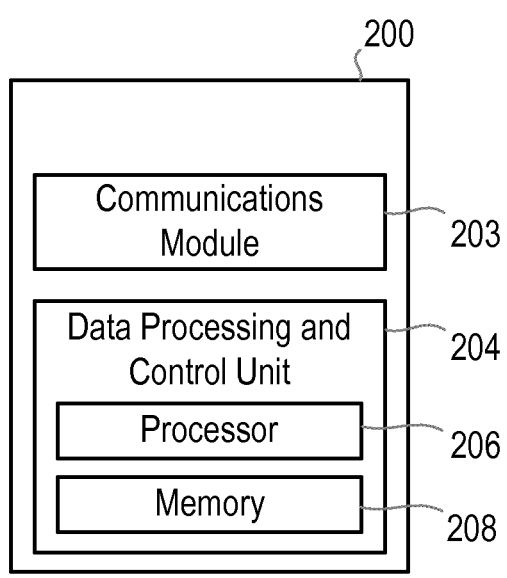
FIG. 2 shows a device from the communications network of FIG. 1.

FIG. 2 shows the form of the base station 200, although it will be appreciated that the base stations 200, 202 are of generally similar form. The base station 200 includes a communications module 203 and a data processing and control unit 204. The data processing and control unit 204 includes a processor 206 and a memory 208. The processor 206 performs data processing and logical operations, and the memory 208 stores working data and program instructions for causing the processor to perform the methods described herein. The communications module 203 generates signals in a suitable form for transmission in accordance with a suitable communications standard, and also receives signals that have been transmitted in accordance with a suitable communications standard, and extracts data from the received signals.

Figure 3:
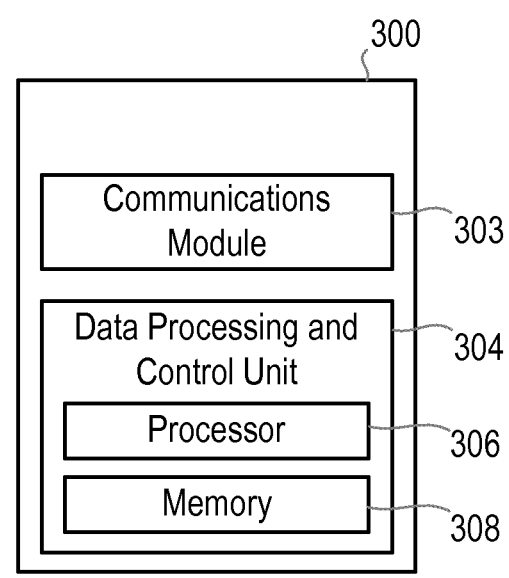
FIG. 3 shows a base station from the communications network of FIG. 1.

FIG. 3 shows the form of the device 300, although it will be appreciated that the devices 300, 302 are of generally similar form. The device 300 includes a communications module 303 and a data processing and control unit 304. The data processing and control unit 304 includes a processor 306 and a memory 308. The processor 306 performs data processing and logical operations, and the memory 308 stores working data and program instructions for causing the processor to perform the methods described herein. The communications module 303 generates signals in a suitable form for transmission in accordance with a suitable communications standard, and also receives signals that have been transmitted in accordance with a suitable communications standard, and extracts data from the received signals.

Figure 4:
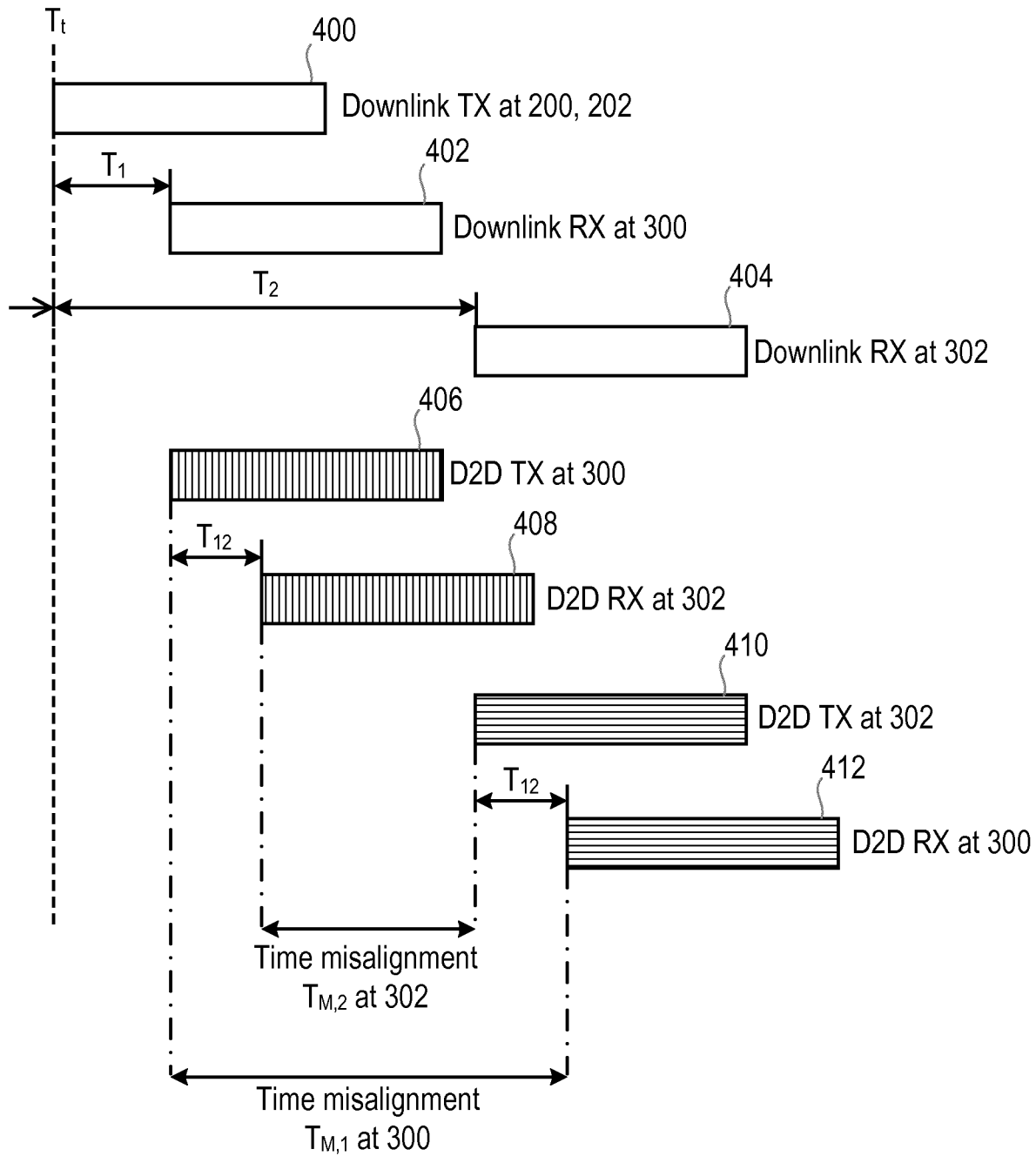
FIG. 4 shows the timing of signals in the communications network of FIG. 1 when using cellular downlink timing for D2D communications.

FIG. 4 illustrates a situation with which the method is concerned, where a cellular downlink timing is used for direct D2D communications between the devices 300, 302.

FIG. 4 shows a signal 400 being transmitted on the downlink, that is, from a base station such as the base station 200, 202, at a time $T_t$. In this illustrated example, the two base stations 200, 202 are synchronized and transmit the signal 400 simultaneously.

FIG. 4 then shows the signal 402 transmitted from the base station 200 being received on the downlink, at a device such as the device 300. The time reference at the device 300 is given by the time of arrival of the signal transmitted from the base station 200 at the device 300 itself. In one example, this may be the time of arrival at a UE of LTE subframes broadcast by its serving eNB. That is, the time reference for the device 300 corresponds to the transmission time of the base station 200 plus a first propagation delay (or time) to the device 300. The device 300 measures the time of arrival of the signal to give the time reference. The time reference is for use by the device 300 in timing communications with other devices, as described earlier. As such, the time reference is used by the device to time communications with a base station or other device. Thus, the time reference provides for the time based communications resources to be used. The time reference provides for timing of transmission and receiving data. In this illustrated situation, the first propagation delay, that is, the time taken for the signal to travel the distance between the base station 200 and the device 300, is indicated as $T_1$.

FIG. 4 then shows the signal 404 transmitted from the base station 202 being received on the downlink, at a device such as the device 302. The time reference at the device 302 is given by the time of arrival of the signal transmitted from the base station 202 at the device 302 itself. In one example, this may be the time of arrival at a UE of LTE subframes broadcast by its serving eNB. That is, the time reference for the device 302 corresponds to the transmission time of the base station 202 plus a second propagation delay (or time) to the device 302. The device 302 measures the time of arrival of the signal to give the time reference. The time reference is for use by the device 302 in timing communications with other devices, as described earlier. In this illustrated situation, the second propagation delay, that is, the time taken for the signal to travel the distance between the base station 202 and the device 302, is indicated as $T_2$.

FIG. 4 additionally shows a signal 406 generated at the device 300 being transmitted from the device 300 to the other device 302.

FIG. 4 then shows the signal 408 transmitted from the device 300 being received at the other device 302. In this illustrated situation, a third propagation delay, that is, the time taken for the signal to travel the distance between the device 300 and the other device 302, is indicated as $T_{12}$.

FIG. 4 then shows a signal 410 generated at the device 302 being transmitted from the device 302 to the other device 300.

FIG. 4 then shows the signal 412 transmitted from the device 302 being received at the other device 300. Again, in this illustrated situation, the third propagation delay, that is, the time taken for the signal to travel the distance between the device 302 and the other device 300, is indicated as $T_{12}$.

In this illustrated situation, specific signalling from the base station 200, 202 to the devices 300, 302 is not used to establish the downlink time reference since any signal may be used to estimate the time of arrival of the down link transmission. As mentioned above, the time of arrival of the down link transmission may be the time of arrival at a UE of LTE subframes broadcast by its serving eNB. It may be that different devices have different time references. That is, the signal transmitted by a device (using the device transmitter's time reference) may not arrive at the receiver within a desired interval (based on the device receiver's time reference), even if the transmitter and receiver are very close to each other (i.e. even if the propagation time between the transmitter and receiver is below a certain threshold, which may be the duration of the cyclic prefix, $T_{CP}$). In one example, each device may have a timing reference that is based on the propagation time between that device and the serving base station and this propagation time may not equal the propagation time between the devices themselves. This may even apply for a single base station serving two devices.

In this illustrated situation, there is a time misalignment at the device 300, which is indicated as $T_{M,1}$, and a time misalignment at the device 302, which is indicated as $T_{M,2}$. In particular, the time reference for transmission of signals from one device to another and the time reference for receipt of those signals by the other device (i.e. the windows set for transmission and receipt of a signal) for communications between those devices are not aligned, since those time references are dependent on the propagation delay between the devices and their serving base stations and also the propagation delay between the devices themselves. In another example, the time misalignment between the devices 300, 302 may not be related to the propagation distance between the devices themselves, but may be related to the propagation time between each base station 200, 202 and its served device 300, 302. The time references of the devices 300, 302 are thus not compatible with each other for device to device communication. Moreover, the misalignment between UE pairs may not be reciprocal, meaning that the device 300 may be time aligned with the other device 302 but the other device 302 may not be time aligned with the device 300. There may also be an abrupt change in the time reference when a device changes from one serving base station to another, which may lead to communication errors.

Figure 5:
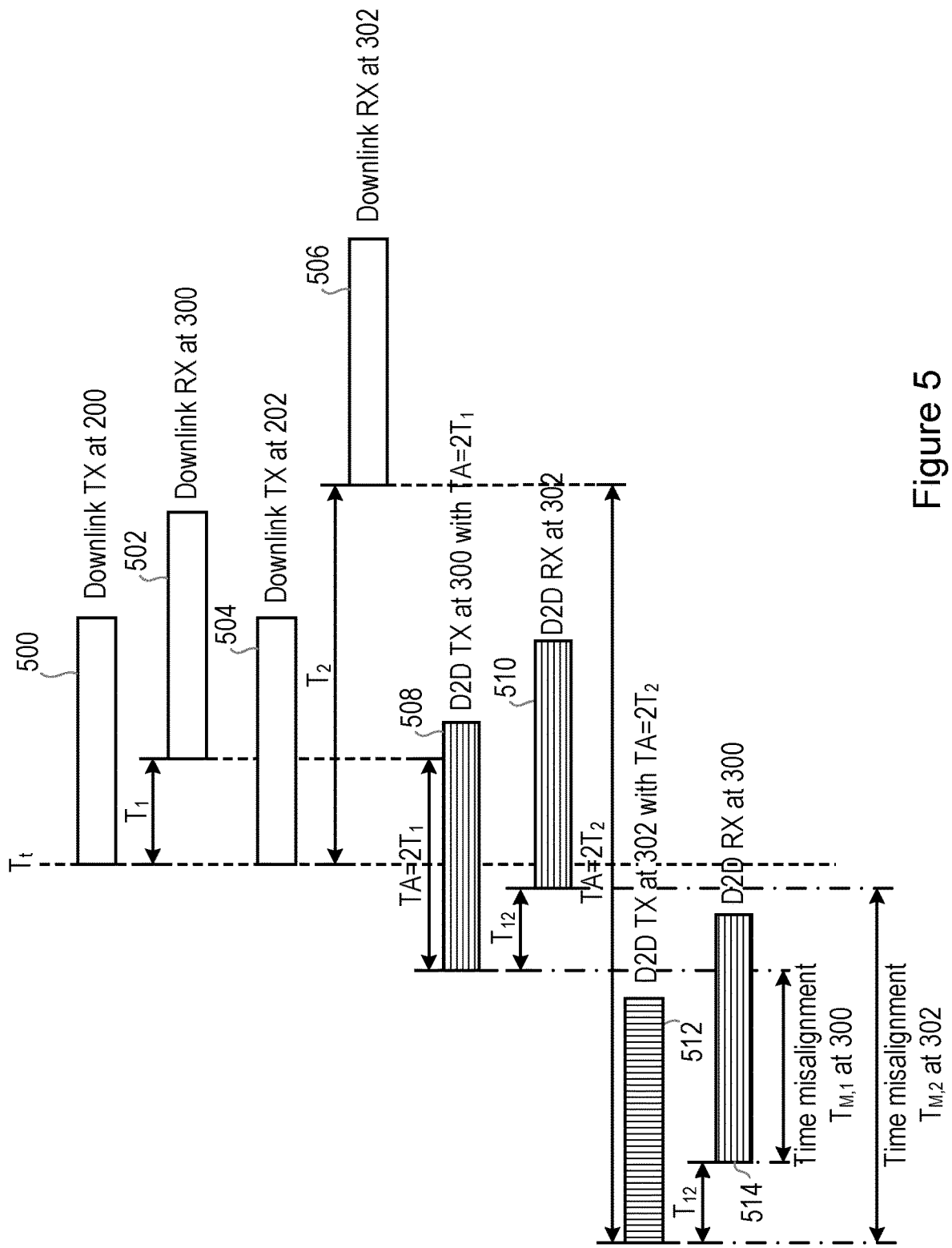
FIG. 5 shows the timing of signals in the network of FIG. 1 when using cellular uplink timing for D2D communications.

FIG. 5 illustrates another situation with which the method is concerned, where a cellular uplink time reference is used for D2D communications between the devices 300, 302. In this illustrated situation, the devices 300, 302 obtain an uplink time reference for use in transmission to other devices and this uplink time reference is obtained by applying a timing advance to a downlink time reference. The obtained uplink time reference is such that the devices 300, 302 communicating using the obtained uplink time reference transmit earlier than those devices 300, 302 would otherwise have transmitted in order to compensate for propagation delays.

FIG. 5 shows a signal 500 being transmitted on the downlink, that is, from a base station such as the base station 200, at a time $T_r$.

FIG. 5 then shows the signal 502 transmitted from the base station 200 being received on the downlink, at a device such as the device 300. In this illustrated situation, the first propagation delay, that is, the time taken for the signal to travel the distance between the base station 200 and the device 300, is indicated as $T_1$.

FIG. 5 then shows the signal 504 (which is the same signal as the signal 500 transmitted from the base station 200) being transmitted on the downlink, that is, from the base station 202, also at the time $T_r$. In other words, in this illustrated example, the two base stations 200, 202 are synchronized and transmit the same signal simultaneously.

FIG. 5 then shows the signal 506 transmitted from the base station 202 being received on the downlink, at a device such as the device 302. In this illustrated situation, the second propagation delay, that is, the time taken for the signal to travel the distance between the base station 200 and the device 300, is indicated as $T_2$.

FIG. 5 then shows a signal 508 generated at the device 300 being transmitted from the device 300 to the other device 302 with a timing advance (TA) that is approximately equal to twice the propagation time from the device 300 to the serving base station 200, i.e. TA=$2T_1$. In other words, the device 300 advances its downlink time reference by an amount $2T_1$. The idea is to compensate for the propagation delays by starting to transmit earlier. The measurements for determining an appropriate timing advance may be obtained by the base station 200 and reported to the device 300 using specific signalling (for example, using timing advance commands). For example, the timing advance may be indicated by an index corresponding to a timing advance or by signalling a value of a timing advance.

FIG. 5 then shows the signal 510 transmitted from the device 300 being received at the other device 302. In this illustrated situation, the third propagation delay, that is, the time taken for the signal to travel the distance between the device 300 and the other device 302, is indicated as $T_{12}$.

FIG. 5 then shows a signal 512 generated at the device 302 being transmitted from the device 302 to the other device 300 with a timing advance (TA) of $2T_2$. In other words, the device 302 advances its downlink time reference by an amount $2T_2$. The measurements for determining an appropriate timing advance may be obtained by the base station 202 and reported to the device 302 using specific signalling (for example, using timing advance commands). The value of the timing advance may be approximately equal to twice the propagation time from the device 302 to the serving base station 202, i.e. TA=$2T_2$.

FIG. 5 then shows the signal 514 transmitted from the device 302 being received at the other device 300. Again, in this illustrated situation, the third propagation delay, that is, the time taken for the signal to travel the distance between the device 302 and the other device 300, is indicated as $T_{12}$.

In this illustrated situation, there is a time misalignment at the device 300, which is indicated as $T_{M,1}$, and a time misalignment at the device 302, which is indicated as $T_{M,2}$. The time references of the devices 300, 302 are thus not compatible with each other for device to device communication.

Figure 6:
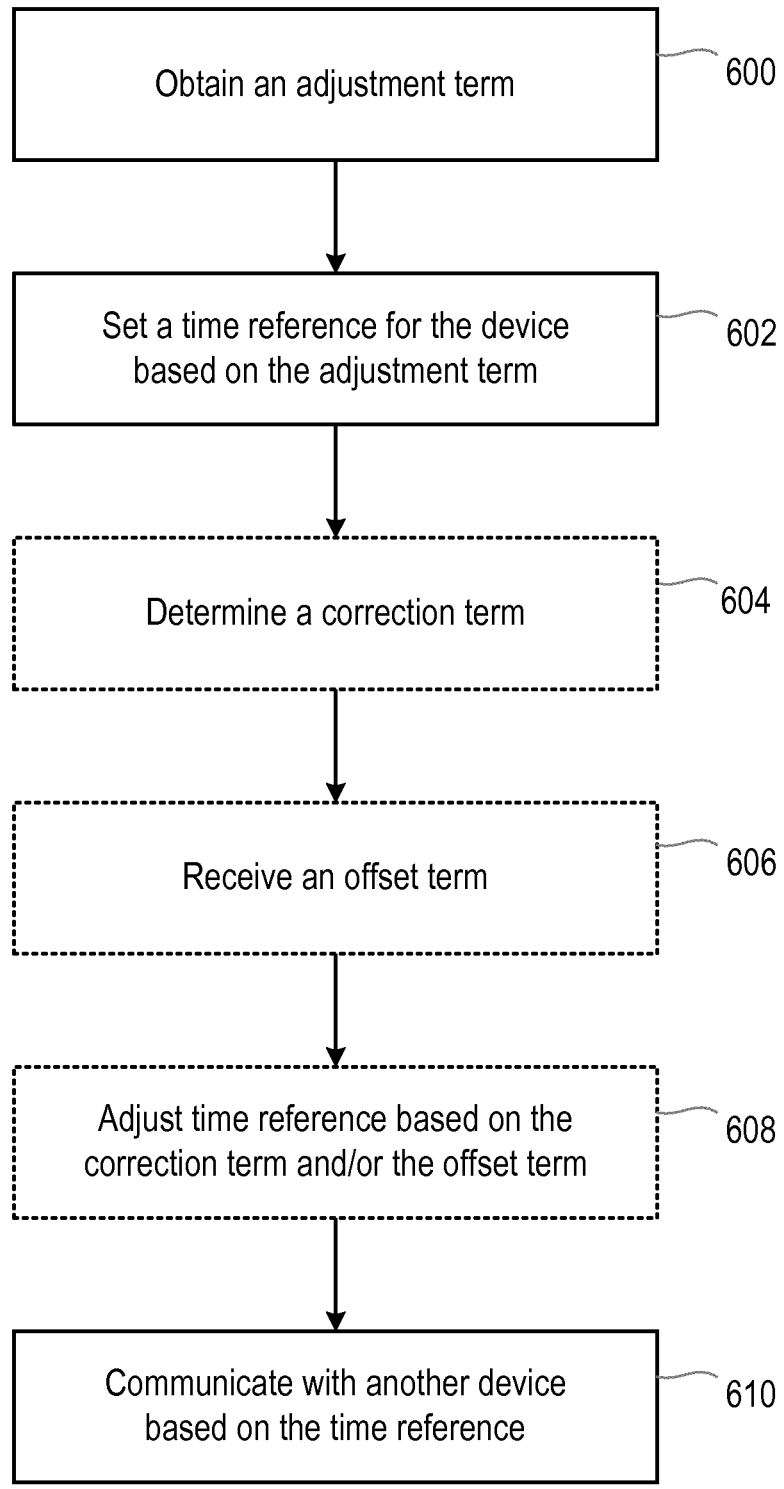
FIG. 6 is a flow chart illustrating a method performed in a device of the communications network of FIG. 1 according to the disclosure.

FIG. 6 is a flow chart illustrating a method performed in a device that corrects the misalignments resulting in the illustrated situations of FIGS. 4 and 5, thereby improving synchronization. The method of FIG. 6 may be performed in the devices 300, 302. Although the method will be described in terms of it being performed in device 300, it will be appreciated that the method may alternatively or also be performed in the other device 302 or any other device.

In step 600, the device 300 obtains an adjustment term ($T_{NW}$) based on communications from the communications network 100. The adjustment term is such that the set time reference for the device 300 is common to at least one other device 302 in D2D communication with the device 300. The adjustment term may relate to a propagation delay associated with the device 300. For example, the adjustment term may compensate for a one-way propagation delay between the device 300 and the base station 200. In particular, the adjustment term may be a timing advance that is equal to the first propagation delay (i.e. the time taken for a signal to travel the distance) between the device 300 and the base station 200, $T_1$.

The device 300 may periodically obtain an updated adjustment term ($T_{NW}$) based on communications from the communications network 100. The device 300, 302 may then adjust the set time reference for the device 300 based on the updated adjustment term ($T_{NW}$).

In one example, the device 300 may obtain the adjustment term ($T_{NW}$) based on communications from the communications network 100. For example, the device 300 may receive the adjustment term ($T_{NW}$) from a base station 200 in the communications network 100. Alternatively, the device 300 may itself derive the adjustment term ($T_{NW}$) based on a measurement of signals transmitted to and received from the base station 200.

In step 602, once the device 300 has obtained an adjustment term ($T_{NW}$), the device 300 sets a time reference for the device 300 based on the obtained adjustment term ($T_{NW}$).

The adjustment term may, for example, be in the form of a timing advance (TA) command and setting a time reference for the device 300 based on the obtained adjustment term ($T_{NW}$) may allow in coverage devices 300, 302 to obtain a common time reference. For example, the timing advance command may instruct the device 300 to set its transmissions to start at the same time as the other device 302. The timing advance commands may be specific for each device 300, 302. For example, the timing advance command may correspond to a device to base station propagation time, which may be different for each device. This propagation time may be a one-way propagation time, i.e.

the propagation time may relate to the propagation between device and base station in one direction. In other words, the propagation time may be half of the usual timing advance. Additional corrections may be made the time reference as described, but such additional corrections do not correspond to the total measured time to propagate between the base station and device.

In one example, the adjustment term ($T_{NW}$) may be in the form of an absolute value to which the time reference is to be set for the device and setting the timing of transmission to the at least one other device based on the adjustment term ($T_{NW}$) may comprise setting the timing of transmission to the absolute value. Alternatively, the adjustment term ($T_{NW}$) may provide a shift for the time reference and setting the time reference for the device based on the adjustment term ($T_{NW}$) may comprise shifting the time reference for the device forward or backwards in time. In other words, the adjustment term ($T_{NW}$) may be in the form of a relative offset to be applied to a previous time reference.

The adjustment term ($T_{NW}$) may provide a baseline value for the time reference and further adjustments or corrections may be made to that baseline value for the time reference using correction terms and/or further adjustment terms, which will be discussed later.

In step 610, the device 300 communicates with the at least one other device in device-to-device communication, based on the common set time reference. For example, the device 300 may transmit data signals to the at least one other device 302 based on the set time reference.

The method may further comprise an optional step 604, in which the device 300 may determine a correction term ($T_{UE}$) based on a measurement of downlink signals at the device 300. For example, the device 300 may determine a correction term ($T_{UE}$) based on a change of timing between successive downlink signals received by the device 300. In one example, the correction term ($T_{UE}$) may correspond to a quantized version of the change of timing between successive downlink signals received by the device 300.

In more detail, at a certain time $T_A$, the device 300 may acquire downlink timing information based on reference signals transmitted by the communications network 100. At a later time, the network 100 may transmit further reference signals. The device 300 is able to estimate the time of arrival of the reference signals $T_B$ based on a previous time reference set for the device 300. However, since the conditions may have changed since the time reference was set (for example, the device 300 may have moved), the actual time of arrival of the reference signals may be $T_B+\Delta t$, where $\Delta t$ denotes an advancement or a delay. In the process of re-acquiring (or re-calibrating) downlink timing, the device 300 may detect a change from $T_B$ to $T_B+\Delta t$. The device 300 may then obtain the term $\Delta t$ by computing the difference between the actual time of arrival of the reference signals and the expected time of arrival of the reference signals. The term $\Delta t$ may reflect changes in the propagation time between a base station 200 and the device 300 and, thus, can be used by the device 300 to perform local adjustments on the timing for D2D communications. In one example, the reference signals transmitted by the communications network 100 may be the same for all devices 300, 302 that are in coverage in the communications network. In other example, the reference signals transmitted by the communications network 100 may be specific to each device.

Once the device 300 has determined a correction term ($T_{UE}$) based on a measurement of downlink signals at the device 300, the optional step 608 may be performed in which the device 300 then adjusts the set time reference for the device 300 based on the determined correction term ($T_{UE}$).

In this way, the device 300 autonomously corrects misalignment in the time reference of the device 300. For example, the device 300 may determine from the measurements of downlink signals that successive signals have become closer together (which may suggest that the device 300 has moved closer to the base station 200) and the device 300 is able to correct for this change. Similarly, the device 300 may determine from the measurements of downlink signals that successive signals have become further apart (which may suggest that the device 300 has moved further away from the base station 200) and the device 300 is able to correct for this change. In this way, the device 300 is able to compensate for propagation delay variations that occur over time.

The correction term ($T_{UE}$) may be in the form of a relative offset to be applied on top of the baseline value provided by the adjustment term ($T_{NW}$).

In one example, the device 300 may determine the correction term ($T_{UE}$), whereas the adjustment term ($T_{NW}$) may be obtained from the communications network 100 from the base station 200.

The device 300 may periodically determine an updated correction term ($T_{UE}$) based on a change of timing between successive downlink signals received by the device 300.

The device 300 may then adjust the set time reference for the device 300 based on the updated correction term ($T_{UE}$). In one example, the device 300 may obtain an updated adjustment term ($T_{NW}$) based on communications from the communications network 100 less periodically than it determines an updated correction term ($T_{UE}$) based on a change of timing between successive downlink signals received by the device 300. For example, the correction term ($T_{UE}$) may be continuously updated based on the reception of downlink signals, whereas the adjustment term ($T_{NW}$) may be updated less often in order to minimise the use of uplink resources.

The method may further comprise an optional step 606, in which the device 300 may receive a signal comprising an offset term ($T_{offset}$) from the communications network 100. The offset term ($T_{offset}$) may, for example, be arranged to compensate for a difference in timing reference between base stations 200, 202 of the communications network 100. The offset term ($T_{offset}$) may be chosen in various different ways and some examples will now be provided.

In one example, where two base stations 200, 202 in the communications network 100 do not transmit in the downlink at the same time, then the method described above may not provide completely compatible time references at the devices 300, 302. In order to compensate for this, one of the two base stations 200 may transmit to the devices 300 in its coverage area a value of $T_{offset}$ that makes the offset time compatible with those of the devices 302 under coverage of the other base station 202. In this case, $T_{offset}$ may correspond to the difference between downlink timings of the base stations 200, 202. Alternatively, $T_{offset}$ may account for radius differences between cells that results in different propagation delays in such cells.

In another example, where two base stations 200, 202 in the communications network 100 have the same downlink timing, then the value of $T_{offset}$ may be used to configure the devices 300, 302 in coverage in the communications network 100 so that their transmissions start at a certain time T, which may be different to the time for starting downlink transmission. This may be particularly beneficial for the purposes of other devices that are not in coverage of any cell in the communications network 100 that transmit according to some predefined rule, for example, based on Coordinated Universal Time (UTC), to enable devices in coverage in the communications network to also D2D communicate with devices that are out of coverage. In this case, $T_{offset}$ may depend on the time reference used by out-of-coverage devices and the downlink timing of the base stations. This may also be beneficial for base stations to avoid downlink timing and D2D timing coinciding, for example, to avoid special patterns of interference. In this case, $T_{offset}$ may have a value that is chosen to minimise undesirable interference problems.

Although some examples have been provided for choosing the offset term ($T_{offset}$) here, it will be appreciated that other methods for choosing the offset term ($T_{offset}$) are also possible.

Once the device 300 has received an offset term ($T_{offset}$) from the communications network 100, the optional step 608 may be performed in which the device 300 may then adjust the set time reference for the device 300 based on the offset term ($T_{offset}$) from the communications network 100.

The offset term ($T_{offset}$) may be a term that is common to the device 300 and other devices that are served by the serving base station 200 of the device 300. The offset term ($T_{offset}$) may be set to time align the device 300 with at least one other device 302 served by a different base station 202. For example, the offset term ($T_{offset}$) may be used to time align devices 300, 302 served by different base stations 200, 202, where the base stations 200, 202 are not time aligned.

In one example, the base station 200 may send the signal comprising an offset term ($T_{offset}$), which the device 300 then detects.

The device 300 may detect a signal comprising a time reference from a satellite system. The device 300 may then adjust the set time reference for the device 300 based on the time reference from the satellite system.

In one example, both the device 300 and the at least one other device 302 may be in-coverage in the communications network 100. In another example, the device 300 may be in-coverage in the communications network 100 and the at least one other device 302 may be out-of-coverage.

The devices that are out-of-coverage may align their time reference to an absolute reference according to a certain rule. As mentioned above, a device may detect a signal comprising a time reference from a satellite system and may then adjust its time reference based on the time reference from the satellite system. For example, the devices may use Coordinated Universal Time (UTC) to align their time references since most devices will have access to a Global Navigation Satellite System (GNSS) receiver such as a Global Positioning System (GPS) receiver, a Global Navigation Satellite System (GLONASS) receiver, a Galileo receiver, etc. The GNSS receiver may provide an estimate of UTS to the devices. The certain rule for deriving the configuration parameter may be part of a pre-configuration installed in the devices or may be determined by the network and transmitted to the out-of-coverage devices, for example, by means of control signalling. For example, the control signalling may include using Physical Sidelink Broadcast Channel (PSBCH) channels.

In one aspect, there may be provided a method of operation of a device in a communications network, the method comprising:

obtaining an adjustment term based on a signal from a satellite system;

setting a time reference for the device based on the obtained adjustment term, wherein the adjustment term is such that the set time reference for the device is common to at least one other device; and communicating with the at least one other device in device-to-device communication, based on the common set time reference.

In another aspect, there may be provided a device for use in a communications network, the device comprising:

a communications module operable to detect a signal from a satellite system; and a processor operable to obtain an adjustment term based on the signal from the satellite system and to set a time reference for the device based on the obtained adjustment term, wherein the adjustment term is such that the set time reference for the device is common to at least one other device in communication with the device.

The method may allow devices that are in-coverage and devices that are out-of-coverage to share a common time reference. In particular, the communications network may set a time reference for devices that are in-coverage so that the time reference is aligned with an absolute time reference used by devices that are out-of-coverage. For example, this may be achieved by adjusting a time reference for in-coverage devices with respect to downlink timing and out-of-coverage devices with respect to UTC timing.

The device 300 may apply any combination of the adjustment, correction and offset terms to set the time reference for the device 300. In one example, the device 300 may set the time reference for the device 300 based on the sum of an adjustment term ($T_{NW}$) obtained by the network and a correction term ($T_{UE}$) obtained autonomously by the device plus an offset term ($T_{offset}$), which may be common to all devices served by a given base station.

In other words, the device 300 may apply a timing advance command in the form of:

$$TA = T_{NW} + T_{UE} + T_{offset}$$

However, it will be appreciated that any other combination of the adjustment, correction and offset terms to set the time reference for the device 300 are possible.

Figure 7:
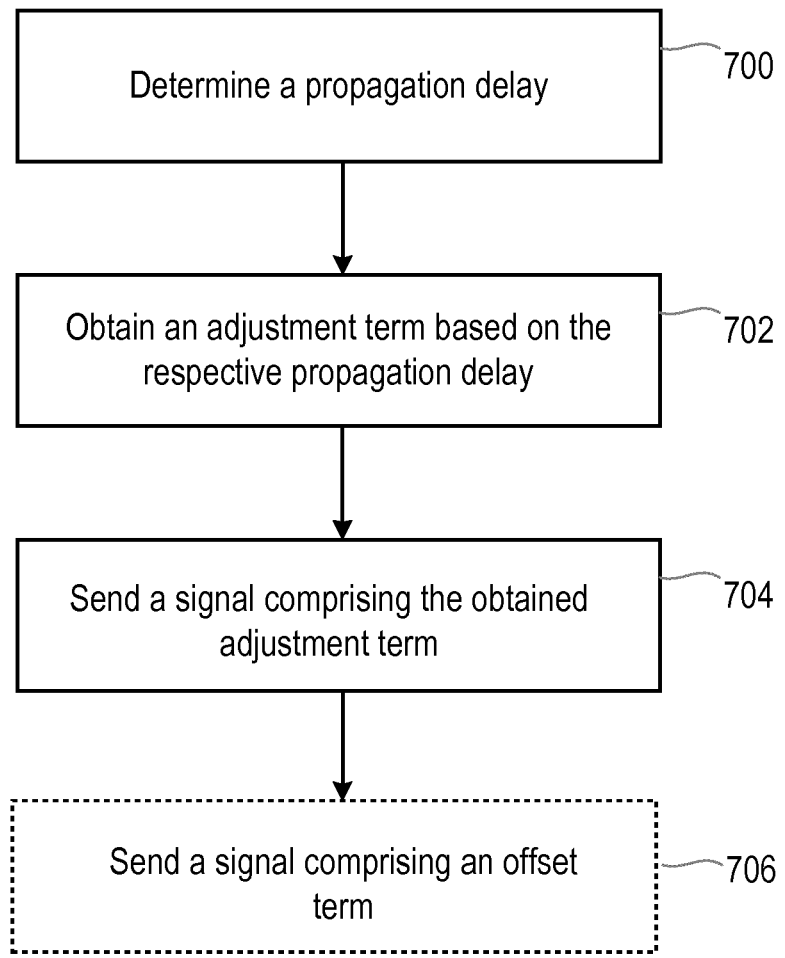
FIG. 7 is a flow chart illustrating a method performed in a base station of the communications network of FIG. 1 according to the disclosure.

FIG. 7 is a flow chart illustrating a method performed in a base station. The method is arranged to reduce the timing misalignments resulting in the illustrated situations of FIGS. 4 and 5, thereby improving D2D synchronization. Although the method will be described in terms of it being performed in base station 200, it will be appreciated that the method may alternatively or also be performed in the other base station 202 or any other base station or network controller.

In step 700, the base station 200 determines a propagation delay for each device 300 served by the base station 200. The base station 200 may determine the propagation delay for each device based on a measurement of uplink signals received at the base station 200.

In more detail, the base station 200 may transmit reference signals in the downlink at time $T_d$. These reference signals are received at the device 300 at time $T_d+T_1$, where $T_1$ is the propagation delay between the base station 200 and the device 300. At a later time, $T_d+T_1+k$, the device 300 transmits in the uplink. Here, k is an amount of time that may be known by both the base station 200 and the device 300. For example, the base station 200 may instruct the device 300 to transmit in k seconds. The base station 200 may then receive the transmission from the device 300 at a time $T_d+2T_1+k$. The base station 200 may also estimate, according to its own timing, that this transmission should have arrived at time $T_d+k$. The base station 200 then estimates the value of $2T_1$, taking into account the difference between the actual time of arrival and the expected time of arrival.

In step 702, the base station 200 obtains an adjustment term ($T_{NW}$) for each device 300 served by the base station based on the respective propagation delay determined for the device 300.

The base station 200 may periodically obtain an updated adjustment term ($T_{NW}$) for each device served by the base station 200 based on the respective propagation delay determined for the device 300. The base station 200 may then send a signal comprising the obtained updated adjustment term ($T_{NW}$) to the respective devices 300 so that the devices transmit according to the same time reference.

In step 704, the base station 200 sends a signal comprising the obtained adjustment term ($T_{NW}$) to the respective devices 300 so that the devices 300 transmit according to the same time reference.

The device 300 may receive the adjustment term ($T_{NW}$) from the base station 200, as described earlier.

In an optional step 706, the base station 200 may also send a signal comprising an offset term ($T_{offset}$) to the devices served by the base station 200 so that the devices transmit according to the same time reference as the base station.

Figure 8:
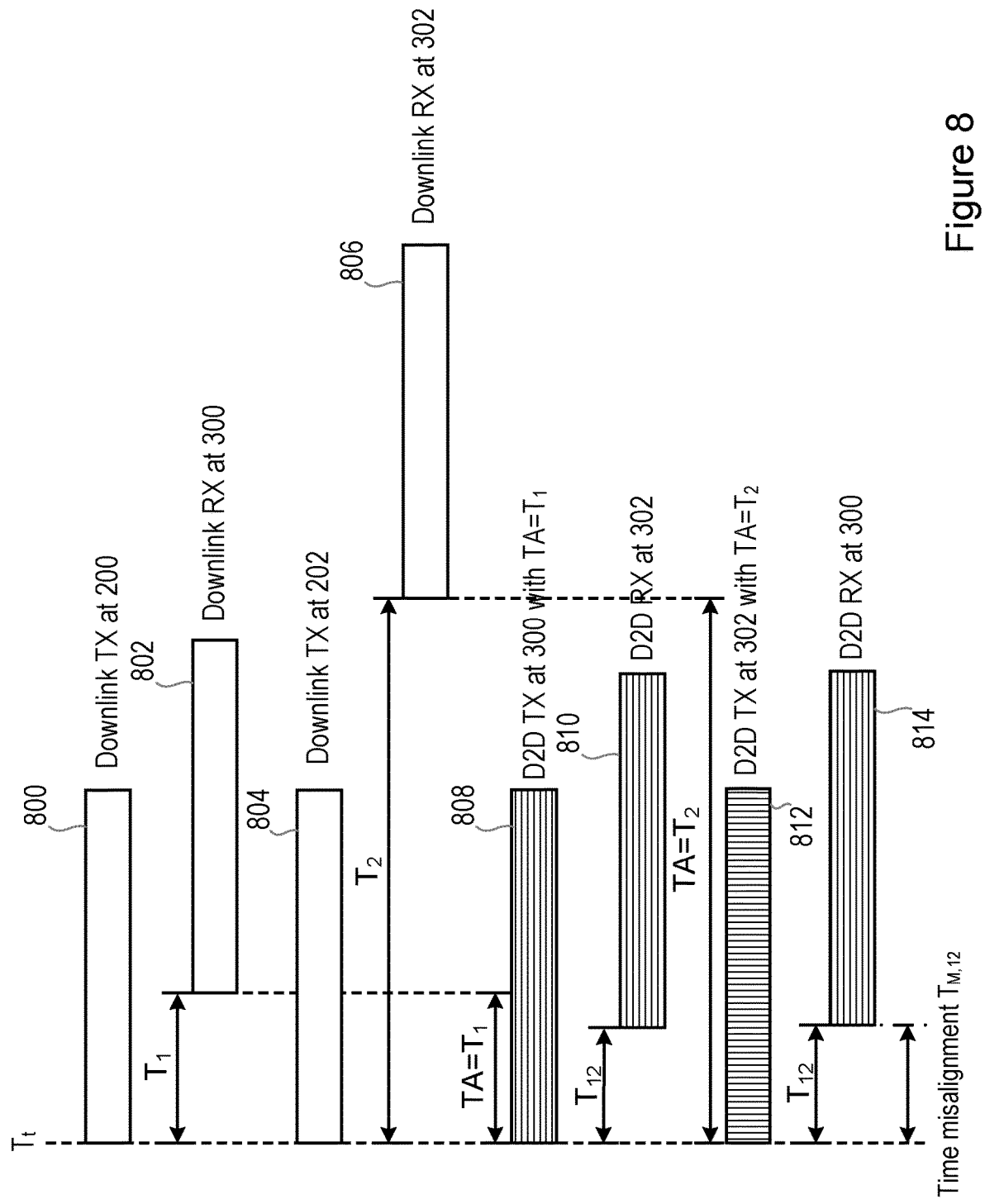
FIG. 8 shows the timing of signals in the communications network of FIG. 1 when using the method according to the disclosure for D2D communications.

FIG. 8 illustrates a situation where the method described above is employed.

FIG. 8 shows a signal 800 being transmitted on the downlink, that is, from a base station such as the base station 200, at a time $T_t$.

FIG. 8 then shows the signal 802 transmitted from the base station 200 being received on the downlink, at a device such as the device 300. In this illustrated situation, the first propagation delay, that is, the time taken for the signal to travel the distance between the base station 200 and the device 300, is indicated as $T_1$.

FIG. 8 then shows the signal 804 being transmitted on the downlink, that is, from the base station 202, also at the time $T_t$. In other words, in this illustrated example, the two base stations 200, 202 are synchronized and transmit the same signal simultaneously.

If this were not the case, the offset term ($T_{offset}$) may be added to the timing advance of the devices to ensure aligned transmissions.

FIG. 8 then shows the signal 806 transmitted from the base station 202 being received on the downlink, at a device such as the device 302. In this illustrated situation, the second propagation delay, that is, the time taken for the signal to travel the distance between the base station 202 and the device 302, is indicated as $T_2$.

FIG. 8 then shows a signal 808 generated at the device 300 being transmitted from the device 300 to the other device 302 using D2D communication with a time reference set based on the adjustment term ($T_{NW}$). In particular, the signal 808 is transmitted from the device 300 to the other device 302 with a timing advance (TA) equal to the first propagation delay between the device 300 and the serving base station 200, $T_1$.

FIG. 8 then shows the signal 810 transmitted from the device 300 being received at the other device 302. In this illustrated situation, the third propagation delay, that is, the time taken for the signal to travel the distance between the device 300 and the other device 302, is indicated as $T_{12}$.

FIG. 8 then shows a signal 812 generated at the device 302 being transmitted from the device 302 to the other device 300 using D2D communication with a time reference set based on the adjustment term ($T_{NW}$). In particular, the signal 812 is transmitted from the device 302 to the other device 300 with a timing advance (TA) equal to the second propagation delay between the device 302 and the serving base station 202, $T_2$.

FIG. 8 then shows the signal 814 transmitted from the device 302 being received at the other device 300. Again, in this illustrated situation, the third propagation delay, that is, the time taken for the signal to travel the distance between the device 302 and the other device 300, is indicated as $T_{12}$.

In this illustrated situation, the two devices 300, 302 transmit at the same time, $T_t$. The time misalignment of the devices 300, 302, which is indicated as $T_{M,12}$, is only due to the distance between those devices 300, 302. In other words, the time misalignment $T_{M,12}$ of the devices 300, 302 is equal to the third propagation delay $T_{12}$, that is, the time taken for the signal to travel the distance between the device 302 and the other device 300 (or, similarly, between the device 300 and the other device 302).

There is thus described an improved mechanism for obtaining common time reference for devices in a communications network, which does not depend on the topology of the network to thereby allow improved synchronization. Although some examples are provided in respect of establishing a common time reference, it will be appreciated that other common configuration references for communication (such as a common frequency reference, etc) can be established in a similar manner.

In some aspects, a device 300, 302 in network coverage may determine a synchronization time reference by communication with the cellular communications network 100. This may be based on measurement of a time of arrival of a signal, which may involve the device 300, 302 measuring a time of arrival of a signal from the network 100 (e.g. a base station 200, 202), or the network 100 (e.g. a base station 200, 202) measuring a time of arrival of a signal from the network 100. The time reference may be determined by the device 300, 302 using its own measurement or a measurement signalled to the device 300, 302 from the network 100. As described above, conventionally a timing advance is applied so that communications between a device and a base station are synchronized. In aspects of this disclosure, a different timing advance (adjustment) is applied. For example, the timing adjustment may correspond to a one-way propagation time between device 300, 302 and base station 200, 202. The timing adjustment may be determined by the device 300, 302, for example, by receiving signalling indicating the timing adjustment from the network 100. The time reference may be further adjusted by the device 300, 302 autonomously and/or to offset differences in time references between different base stations 200, 202. The timing adjustment described compensates the propagation delay between devices and base stations. This provides for a plurality of devices to have a common (i.e. substantially the same) adjusted time reference. This is used in direct communication between the devices, e.g. device-to-device communication. Thus, although the time reference used by the devices is based on communication with the cellular network, the adjustment to the time reference facilitates device-to-device communication.

In some aspects, a method of operation of a device in a communications network comprises determining a time reference from communication with a base station of the communications network. The base station determines an adjustment term for the time reference. The adjustment term is a one-way propagation time between the device and a base station of the communications network, as described above. In some aspect, the device adds an additional correction term without base station signalling or knowledge. The device communicates with at least one other device in device-to-device communication, based on the time reference adjusted by the adjustment term. The above features may define an aspect of the disclosure, without inclusion of the feature that devices use the adjustment term to operate on a common time reference. This allows for the time reference of the different devices in D2D communication to be common, and approximately synchronized, even though the synchronization is based on a timing and adjustment term/corrections derived from (possibly different) base station(s). Examples also include a device (e.g. UE, end device) operating according to this or any other example method.

In some aspects, a method of operation of a base station for a communications network comprises determining an adjustment term for adjustment of a time reference of a device in the communications network. The adjustment term is a one-way propagation time between the device and the base station. The adjustment term is a only for one-way propagation, not two-way. Optionally, the base station also includes or separately determines a correction term to align the time reference with another base station or external accurate clock (e.g. satellite signal). The base station transmits the adjustment term (and any additional correction) to the device. The adjustment term is used by the device for D2D communications. The above features may define an aspect of the disclosure, without inclusion of the feature that devices use the adjustment term to operate on a common time reference. Examples also include a base station (e.g. eNB) operating according to this or any other example method.

Aspects of the disclosure may be defined, in any combination, as:

A method of operation of a device in a communications network, the method comprising: obtaining an adjustment term ($T_{NW}$) based on communications from the communications network; setting a time reference for the device based on the obtained adjustment term ($T_{NW}$), wherein the adjustment term is such that the set time reference for the device is common to at least one other device; and communicating with the at least one other device in device-to-device communication, based on the common set time reference.

A method wherein the adjustment term is a one-way propagation time between the device and a base station of the communications network.

A method wherein obtaining an adjustment term ($T_{NW}$) based on communications from the communications network comprises receiving the adjustment term from a base station in the communications network or deriving the adjustment term based on a measurement of signals transmitted to and received from a base station in the communications network.

A method further comprising: determining a correction term ($T_{UE}$) based on a change of timing between successive downlink signals received by the device; and adjusting the set time reference for the device based on the determined correction term ($T_{UE}$).

A method further comprising: receiving a signal comprising an offset term ($T_{offset}$) from the communications network, wherein the offset term is arranged to compensate for a difference in time reference between base stations; and adjusting the set time reference for the device based on the offset term ($T_{offset}$) from the communications network.

A method comprising: periodically obtaining an updated adjustment term ($T_{NW}$) based on communications from the communications network; periodically determining an updated correction term ($T_{UE}$) based on a change of timing between successive downlink signals received by the device; and adjusting the set time reference for the device based on the updated adjustment term ($T_{NW}$) and the updated correction term ($T_{UE}$).

A method comprising: obtaining an updated adjustment term ($T_{NW}$) based on communications from the communications network less periodically than determining an updated correction term ($T_{UE}$) based on a change of timing between successive downlink signals received by the device.

A method comprising: detecting a signal comprising a time reference from a satellite system; and adjusting the set time reference for the device based on the further time reference from the satellite system.

A method wherein the device is in-coverage in the communications network and the at least one other device is out-of-coverage.

A device for use in a communications network, the device comprising: a communications module operable to communicate with a communications network; and a processor operable to obtain an adjustment term ($T_{NW}$) based on communications from the communications network and to set a time reference for the device based on the obtained adjustment term ($T_{NW}$), wherein the adjustment term is such that the set time reference for the device is common to at least one other device and wherein the communications module is operable to communicate with the at least one other device in device-to-device communication, based on the common set time reference.

A device wherein the adjustment term is a one-way propagation time between the device and a base station of the communications network.

A device wherein the processor is operable to obtain an adjustment term ($T_{NW}$) based on communications from the communications network by receiving the adjustment term from a base station in the communications network or deriving the adjustment term based on a measurement of signals transmitted to and received from a base station in the communications network.

A device wherein the processor is further operable to determine a correction term ($T_{UE}$) based on a change of timing between successive downlink signals received by the device and adjust the set time reference for the device based on the determined correction term ($T_{UE}$).

A device wherein the communications module is further operable to receive a signal comprising an offset term ($T_{offset}$) from the communications network, wherein the offset term is arranged to compensate for a difference in time reference between base stations and the processor is further operable to adjust the set time reference for the device based on the offset term ($T_{offset}$) from the communications network.

A device wherein the processor is further operable to: periodically obtain an updated adjustment term ($T_{NW}$) based on communications from the communications network; periodically determine an updated correction term ($T_{UE}$) based on a change of timing between successive downlink signals received by the device; and adjust the set time reference for the device based on the updated adjustment term ($T_{NW}$) and the updated correction term ($T_{UE}$).

A device wherein the processor is operable to obtain an updated adjustment term ($T_{NW}$) based on communications from the communications network less periodically than determining an updated correction term ($T_{UE}$) based on a change of timing between successive downlink signals received by the device.

A device wherein the communications module is operable to detect a signal comprising a time reference from a satellite system and the processor is operable to adjust the set time reference for the device based on the further time reference from the satellite system.

A device wherein the device is in-coverage in the communications network and the at least one other device is out-of-coverage.

A method of operation of a base station in a communications network, the method comprising: determining a propagation delay for each device served by the base station; obtaining an adjustment term ($T_{NW}$) for each device served by the base station based on the respective propagation delay determined for the device; sending a signal comprising the obtained adjustment term ($T_{NW}$) to the respective devices so that the devices transmit according to the same time reference.

A method comprising: sending a signal comprising an offset term ($T_{offset}$) to the devices served by the base station, wherein the offset term ($T_{offset}$) is arranged to compensate for a difference in time reference between base stations.

A method wherein the adjustment term is a one-way propagation time between the device and a base station of the communications network.

A method wherein the offset term ($T_{offset}$) is further arranged to compensate for a difference in time reference between a device that is in coverage in the communications network and a device that is out of coverage.

A method comprising: periodically obtaining an updated adjustment term ($T_{NW}$) for each device served by the base station based on the respective propagation delay determined for the device; and sending a signal comprising the obtained updated adjustment term ($T_{NW}$) to the respective devices so that the devices transmit according to the same time reference.

A base station for use in a communications network, the base station comprising: a processor operable to determine a propagation delay for each device served by the base station and to obtain an adjustment term ($T_{NW}$) for each device served by the base station based on the respective propagation delay determined for the device; and a communications module operable to send a signal comprising the obtained adjustment term ($T_{NW}$) to the respective devices so that the devices transmit according to the same time reference.

A base station wherein the communications module is operable to send a signal comprising an offset term ($T_{offset}$) to the devices served by the base station, wherein the offset term ($T_{offset}$) is arranged to compensate for a difference in time reference between base stations.

A base station wherein the adjustment term is a one-way propagation time between the device and a base station of the communications network.

A base station wherein the offset term ($T_{offset}$) is further arranged to compensate for a difference in time reference between a device that is in coverage in the communications network and a device that is out of coverage.

A base station wherein the processor is operable to periodically obtain an updated adjustment term ($T_{NW}$) for each device served by the base station based on the respective propagation delay determined for the device and the communications module is operable to send a signal comprising the obtained updated adjustment term ($T_{NW}$) to the respective devices so that the devices transmit according to the same time reference.

A communications network comprising: a base station as defined in any example, and a device as defined in any example, the device being in coverage of the base station.

A communications network further comprising: at least one other base station as defined in any example; and at least one other device as defined in any example, the at least one other device being in coverage of the at least one other base station, wherein the device in coverage of the base station is operable to communicate with the at least one other device in coverage of the at least one other base station in device-to-device communication, based on the common set time reference.

A method of operation of a device in a communications network, the method comprising: determining a time reference from communication with a base station of the communications network; determining an adjustment term for the time reference, wherein the adjustment term is a one-way propagation time between the device and a base station of the communications network; and communicating with at least one other device in device-to-device communication, based on the time reference adjusted by the adjustment term.

A method of operation of a base station for a communications network, the method comprising: determining an adjustment term for adjustment of a time reference of a device in the communications network, wherein the adjustment term is a one-way propagation time between the device and the base station; and transmitting the adjustment term to the device.

A computer program product, comprising a computer-readable storage medium containing instructions for causing a device to perform a method as defined in any example.

It will be appreciated that the methods according to the disclosure may be implemented in a LTE system or any other wireless systems and, although the methods are described with reference to device to device applications, it will be appreciated that the method can also be applied to other applications.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a device in a communications network, the method comprising:
   obtaining an adjustment term ($T_{NW}$) based on communications from the communications network;
   setting a time reference for the device based on the obtained adjustment term ($T_{NW}$), the adjustment term being such that the set time reference for the device is common to at least one other device, wherein the adjustment term is a one-way propagation time between the device and a base station of the communications network;
   receiving a signal comprising an offset term ($T_{offset}$) from the communications network, wherein when two base stations in the communication network have a same downlink timing, the offset term ($T_{offset}$) is used to configure the device and the at least one other device to start transmission at a certain time T, wherein the certain time T is different from a downlink transmission time of the two base stations;
   adjusting the set time reference for the device based on the offset term ($T_{offset}$) from the communications network and;

communicating with the at least one other device in device-to-device communication based on the adjusted set time reference.

2. The method as claimed in claim 1, wherein obtaining the adjustment term ($T_{NW}$) based on communications from the communications network comprises one of receiving the adjustment term from a base station in the communications network and deriving the adjustment term based on a measurement of signals transmitted to and received from a base station in the communications network.

3. The method as claimed in claim 1, further comprising:
determining a correction term ($T_{UE}$) based on a change of timing between successive downlink signals received by the device; and
adjusting the set time reference for the device based on the determined correction term ($T_{UE}$).

4. The method as claimed in claim 1,
wherein the offset term is arranged to compensate for a difference in time reference between base stations.

5. The method as claimed in claim 1, further comprising:
periodically obtaining an updated adjustment term ($T_{NW}$) based on communications from the communications network;
periodically determining an updated correction term ($T_{UE}$) based on a change of timing between successive downlink signals received by the device; and
adjusting the set time reference for the device based on the updated adjustment term ($T_{NW}$) and the updated correction term ($T_{UE}$).

6. The method as claimed in claim 5, further comprising:
obtaining an updated adjustment term ($T_{NW}$) based on communications from the communications network less periodically than determining an updated correction term ($T_{UE}$) based on a change of timing between successive downlink signals received by the device.

7. The method as claimed in claim 1, further comprising:
detecting a signal comprising a further time reference from a satellite system; and
adjusting the set time reference for the device based on the further time reference from the satellite system.

8. The method as claimed in claim 1, wherein the device is in-coverage in the communications network and the at least one other device is out-of-coverage.

9. A device for use in a communications network, the device comprising:
a communications module configured to communicate with the communications network; and
a processor configured to:
obtain an adjustment term ($T_{NW}$) based on communications from the communications network and to set a time reference for the device based on the obtained adjustment term ($T_{NW}$), the adjustment term being such that the set time reference for the device is common to at least one other device, wherein the adjustment term is a one-way propagation time between the device and a base station of the communications network; and
the communications module is configured to:
receive a signal comprising an offset term ($T_{offset}$) from the communications network, wherein when two base stations in the communication network have a same downlink timing, the offset term ($T_{offset}$) is used to configure the device and the at least one other device to start transmission at a certain time T, wherein the certain time T is different from a downlink transmission time of the two base stations; and communicate with the at least one other device in device-to-device communication based on an adjusted set time reference;
wherein the processor is further configured to adjust the set time reference for the device based on the offset term ($T_{offset}$) from the communications network.

10. The device as claimed in claim 9, wherein the processor is further configured to determine a correction term ($T_{UE}$) based on a change of timing between successive downlink signals received by the device and adjust the set time reference for the device based on the determined correction term ($T_{UE}$).

11. The device as claimed in claim 9, wherein the offset term ($T_{offset}$) is arranged to compensate for a difference in time reference between base stations.

12. A method of operation of a base station in a communications network, the method comprising:
determining a propagation delay for each device served by the base station;
obtaining an adjustment term ($T_{NW}$) for each device served by the base station based on the respective propagation delay determined for the device, wherein the adjustment term is a one-way propagation time between the device and the base station of the communications network;
sending a signal comprising the obtained adjustment term ($T_{NW}$) to the respective devices so that the devices transmit according to a same time reference; and
sending a signal comprising an offset term ($T_{offset}$) to the devices served by the base station, wherein, when two base stations in the communications network have a same downlink timing, the offset term ($T_{offset}$) is used to configure the devices served by the base station to adjust the same time reference based on the offset term ($T_{offset}$) so that the devices transmit at a certain time T that is different from a downlink transmission time of the two base stations.

13. The method as claimed in claim 12,
wherein the offset term ($T_{offset}$) is arranged to compensate for a difference in time reference between base stations.

14. The method as claimed in claim 13, wherein the offset term ($T_{offset}$) is further arranged to compensate for a difference in time reference between a device that is in coverage in the communications network and a device that is out of coverage.

15. The method as claimed in claim 12, further comprising:
periodically obtaining an updated adjustment term ($T_{NW}$) for each device served by the base station based on the respective propagation delay determined for the device; and
sending a signal comprising the obtained updated adjustment term ($T_{NW}$) to the respective devices so that the devices transmit according to the same time reference.

16. A base station for use in a communications network, the base station comprising:
a processor configured to:
determine a propagation delay for each device served by the base station; and
obtain an adjustment term ($T_{NW}$) for each device served by the base station based on the respective propagation delay determined for the device, wherein the adjustment term is a one-way propagation time between the device and the base station of the communications network; and a communications module configured to:
send a signal comprising the obtained adjustment term ($T_{NW}$) to the respective devices so that the devices transmit according to a same time reference; and
send a signal comprising an offset term ($T_{offset}$) to the devices served by the base station, wherein, when two base stations in the communications network have a same downlink timing, the offset term ($T_{offset}$) is used to configure the devices served by the base station to adjust the same time reference based on the offset term ($T_{offset}$) so that the devices transmit at a certain time T that is different from a downlink transmission time of the two base stations.

17. The base station as claimed in claim 16, wherein the offset term ($T_{offset}$) is arranged to compensate for a difference in time reference between base stations.

18. A communications network comprising:
a base station, the base station comprising:
a processor configured to:
determine a propagation delay for each device served by the base station; and
obtain an adjustment term ($T_{NW}$) for each device served by the base station based on the respective propagation delay determined for the device, wherein the adjustment term is a one-way propagation time between the device and the base station of the communications network; and
a communications module configured to:
send a signal comprising the obtained adjustment term ($T_{NW}$) to the respective devices so that the devices transmit according to a same time reference; and
send a signal comprising an offset term ($T_{offset}$) to the devices served by the base station, wherein, when two base stations in the communications network have a same downlink timing, the offset term ($T_{offset}$) is used to configure the devices served by the base station to adjust the same time reference based on the offset term ($T_{offset}$) so that the devices transmit at a certain time T that is different from a downlink transmission time of the two base stations; and
a device, the device comprising:
a communications module configured to communicate with the communications network; and
a processor configured to:
obtain the adjustment term ($T_{NW}$) based on communications from the communications network and to set a time reference for the device based on the obtained adjustment term ($T_{NW}$), the adjustment term being such that the set time reference for the device is common to at least one other device, and
the communications module is configured to:
receive a signal comprising an offset term ($T_{offset}$) from the communications network, wherein, when two base stations in the communication network have a same downlink timing, the offset term ($T_{offset}$) is used to configure the device and the at least one other device to start transmission at a certain time T, wherein the certain time T is different from a downlink transmission time of the two base stations; and
communicate with the at least one other device in device-to-device communication based on an adjusted set time reference, the device being in coverage of the base station;
wherein the processor is further configured to adjust the set time reference for the device based on the offset term ($T_{offset}$) from the communications network.

19. The communications network as claimed in claim 18, the communications network further comprising:
at least one other base station, the at least one other base station comprising:
a processor configured to determine a propagation delay for each device served by the at least one other base station and to obtain an adjustment term ($T_{NW}$) for each device served by the at least one other base station based on the respective propagation delay determined for the device served by the at least one other base station; and
a communications module configured to send a signal comprising the obtained adjustment term ($T_{NW}$) to the respective devices so that the devices transmit according to the same time reference; and
the at least one other device, the at least one other device comprising:
a communications module configured to communicate with the communications network; and
a processor configured to obtain the adjustment term ($T_{NW}$) based on communications from the communications network and to set a time reference for the at least one other device based on the obtained adjustment term ($T_{NW}$), the adjustment term being such that the set time reference for the device is common to the at least one other device, and the communications module is configured to communicate with the at least one other device in device-to-device communication based on the common set time reference, the at least one other device being in coverage of the at least one other base station, and
wherein the device in coverage of the base station is configured to communicate with the at least one other device in coverage of the at least one other base station in device-to-device communication based on the common set time reference.

20. A method of operation of a device in a communications network, the method comprising:
determining a time reference from communication with a base station of the communications network;
determining an adjustment term for the time reference, the adjustment term being a one-way propagation time between the device and a base station of the communications network;
receiving a signal comprising an offset term ($T_{offset}$) from the communications network, wherein when two base stations in the communication network have a same downlink timing, the offset term ($T_{offset}$) is used to configure the device and the at least one other device to start transmission at a certain time T, wherein the certain time T is different from a downlink transmission time of the two base stations;
adjusting the time reference for the device based on the adjustment term and the offset term ($T_{offset}$) from the communications network; and
communicating with at least one other device in device-to-device communication based on the adjusted time reference.

21. A method of operation of a base station for a communications network, the method comprising:
determining an adjustment term for adjustment of a time reference of a device in the communications network, the adjustment term being a one-way propagation time between the device and the base station;

transmitting the adjustment term to the device and
transmitting a signal comprising an offset term ($T_{offset}$) to the devices served by the base station, wherein, when two base stations in the communications network have a same downlink timing, the offset term ($T_{offset}$) is used to configure the devices served by the base station to adjust the time reference based on the offset term ($T_{offset}$) so that the devices transmit at a certain time T that is different from a downlink transmission time of the two base stations.

* * * * *